United States Patent [19]

Fertl

[11] Patent Number: 4,622,849

[45] Date of Patent: Nov. 18, 1986

[54] METHOD AND APPARATUS FOR DETERMINING CHARACTERISTICS OF CLAY-BEARING FORMATIONS

[75] Inventor: Walter H. Fertl, Houston, Tex.

[73] Assignee: Dresser Industries, Inc., Dallas, Tex.

[21] Appl. No.: 749,377

[22] Filed: Jun. 27, 1985

Related U.S. Application Data

[63] Continuation-in-part of Ser. No. 416,826, Sep. 13, 1982.

[51] Int. Cl.$^4$ ............................................. E21B 49/00
[52] U.S. Cl. ...................................................... 73/152
[58] Field of Search ................... 73/151, 152; 364/422; 250/253, 256

[56] References Cited

U.S. PATENT DOCUMENTS

| | | | |
|---|---|---|---|
| Re. 30,827 | 12/1981 | Pelet et al. | 73/152 |
| 3,321,625 | 5/1967 | Wahl | 250/71.5 |
| 3,329,889 | 7/1967 | Tanguy | 324/1 |
| 3,483,376 | 12/1969 | Locke et al. | 250/83.1 |
| 3,500,683 | 3/1970 | Hoyle | 73/152 |
| 3,521,062 | 7/1970 | Nagel | 250/83.1 |
| 3,638,484 | 2/1972 | Tixier | 73/152 |
| 3,772,589 | 11/1973 | Scholberg | 324/10 |
| 3,829,687 | 8/1974 | Caldwell | 250/269 |
| 3,940,610 | 2/1976 | Denis et al. | 250/253 |
| 4,096,385 | 6/1978 | Marett | 250/262 |
| 4,233,839 | 11/1980 | Coates | 73/152 |
| 4,263,509 | 4/1981 | Fertl et al. | 250/255 |
| 4,271,356 | 6/1981 | Groeschel et al. | 250/262 |
| 4,310,887 | 1/1982 | Suau | 364/422 |
| 4,338,664 | 7/1982 | Mayer | 364/422 |
| 4,362,054 | 12/1982 | Rengot | 73/152 |
| 4,484,470 | 11/1984 | Fertl et al. | 73/152 |

OTHER PUBLICATIONS

Dyson, "Diagenesis in Clay-Water-Organic Systems: The Development of Abnormal Subsurface Pressures and The Genesis of Petroleum", Apr. 1980, pp. 18-22.
Habeck, "Abnormal Pressures in The Lower Vicksbury McAllen Ranch Field, South Texas", 1982, p. 250.
Klein, "Bound Water In Shaly Sands-Its Relation to Qv and Other Formation Properties", 1979, The Log Analyst, pp. 3-19.
Fertl, "Evaluation of Shaly Clastic Reservoir Rocks", 1980, Journal of Petroleum Technology, pp. 1641-1645.

*Primary Examiner*—Stewart J. Levy
*Assistant Examiner*—Robert R. Raevis
*Attorney, Agent, or Firm*—Patrick H. McCollum

[57] ABSTRACT

The volume of clay within clay-bearing formations is determined throughout the formations. This volume of clay is then functionally related to measurements indicative of the formations. Utilizing measured formation characteristics representative of different clay types, such as potassium content or bound water content, the formation porosity measurements are extrapolated to indicate the porosity log measurements which would be yielded if the logging devices were responsive only to the clay within the formations. In addition the cation exchange capacity and the percent of expandable clay layers for the shale zones are determined. These extrapolated measurements are then related to known or determinable formation characteristics to determine additional formation properties such as porosity, permeability, and fluid saturation characteristics.

12 Claims, 9 Drawing Figures

METHOD AND APPARATUS FOR DETERMINING CHARACTERISTICS OF CLAY-BEARING FORMATIONS

RELATED CASES

This application is a continuation-in-part of copending U.S. patent application Ser. No. 416,826, which was filed Sept. 13, 1982.

BACKGROUND OF THE INVENTION

This invention relates generally to methods and apparatus for evaluating subsurface formations and more specifically relates to methods and apparatus for determining characteristics of clay-bearing geological formations.

In the oil and gas exploration industry, subsurface formations are investigated to determine if hydrocarbon resources may be found therein. When a subsurface reservoir containing hydrocarbon-bearing formations is discovered, it is important to analyze the reservoir formations and to evaluate the practical and economic feasibility of producing the hydrocarbon resources therefrom. Many factors may be considered in analyzing the producibility of the formations within a reservoir; of particular interest are characteristics such as the reservoir porosity; representing the pore volume of the reservoir formations, the fluid saturation characteristics of the reservoir, representing the fraction of the formation pore volume filled with specific types of fluids, and the reservoir permeability, or the ease with which the fluids flow through the formations. Such reservoir characteristics may be determined through analysis of data relating to various subsurface parameters, such data obtained through use of well logs and/or "core" samples recovered from the subsurface formations. Because reservoir characteristics may change throughout the vertical extent of a reservoir due to the geological composition of the formations contained therein, well log data offers an advantage over core data in that well log data may typically be obtained generally continuously throughout the vertical extent of the reservoir in a manner which is time consuming and difficult to duplicate through reliance upon core samples.

Certain reservoirs, specifically those reservoirs containing shale-bearing formations, may be difficult to fully evaluate using conventional well log analysis techniques. Shales typically contain a predominance of clay minerals of differing types intermixed with a variety of non-clay minerals such as quartz, feldspar, and carbonates. Because these non-clay minerals are essentially inseparably intermixed with the clay mineral and because it is the type of clay minerals within the shales which, directly or indirectly, most significantly affect reservoir properties, the term "clay" is used herein essentially synonymously with "shale", thus including these non-clay minerals, and the "clays" are described in terms of the different clay minerals contained therein. The producibility characteristics of clay-bearing formations are significantly affected by the volumes of clay contained therein. Further, different types of clays and their modes of distribution within the reservoir formations affect reservoir properties differently, even with a consistent volume of clay present. Additionally, the type and volume of clay and the type of distribution thereof may change continually throughout the reservoir formations, thereby causing significant variations in various parameters related thereto. For example the volume of "bound water" within a formation, that volume of formation water which is electrochemically bound to the clay minerals within the formation is functionally related to both the porosity and the permeability of the formation and varies significantly in response to the type and volume of clay and the mode of distribution thereof within the formation.

In the evaluation of the producibility of a reservoir it is not uncommon to rely upon models based upon various geological parameters, including bound water and porosity data, to describe certain reservoir, characteristics, such as fluid saturation and permeability. The accuracy of the characteristics described by the models is clearly dependent upon the accuracy of the data contained therein. Therefore, because of the above-described effects of clay type, volume, and distribution upon reservoir parameters, it is important to continuously evaluate such clay parameters throughout the reservoir.

One means known to the prior art of estimating various reservoir parameters has been to utilize a correlation, such as a graphic crossplot, of two well logs, such as a bulk density log and an acoustic travel time log, or a bulk density log and a neutron log, to establish a graph upon which is indicated a line representing reservoir formations essentially free of shale or clay, or a 0% clay volume, and a single point, determined from the two logs, representing a 100% shale or clay volume within the reservoir the coordinates of such point being the response values of each log in such 100% clay environment. Other responses of the logs are then scaled between these two limits to estimate the clay volume at other horizons within the reservoir. Because of the differing responses of the logging instruments to differing clay types and distributions within the reservoir formations such a method may lead to significant errors in the volume of clay determined at any given depth horizon within the formations. Further, the coordinates or lo response values representing 100% clay are also taken as constants, at least within a given portion of the reservoir, and additional reservoir parameters are determined in response thereto. By establishing these log response values a constant, such as method fails to account for the aforementioned clay types and distributions within the formations and the differing responses of the logging instruments thereto. This method is, therefore, prone to yield further erroneous data regarding those formations.

Accordingly, the present invention provides methods and apparatus whereby formation characteristics may be evaluated throughout the vertical extent of a reservoir and correlated with a generally continous volume of clay determination made independently of such characteristics, such that the volume types, and distribution of clays and the resulting effects upon reservoir parameters may be evaluated with improved accuracy throughout the vertical extent of subsurface formations.

Further, the present invention provides method and apparatus for determination of characteristics of a shale formation without the use of cores. Formation characteristics include a generaly continuous determination of the cation exchange capacity and the percent of expandable clay layers for shale zones.

SUMMARY OF THE INVENTION

A variety of data regarding the reservoir formations is determined, preferably either continuously or at selected incremental depth horizons, throughout a borehole penetrating the formations. In a preferred embodiment, this data will be obtained by well logging devices and will include a formation resistivity measurement, a natural gamma radiation measurement, and two porosity-indicating measurement, preferably a bulk density measurement and a measurement of the formation response to neutron radiation. The volume of clay contained within the formations is determined, preferably generally continuously, at selected incremental depth horizons, within the formations, and preferably in response to the natural gamma radiation measurement. The volume of clay at each selected depth horizon is then functionally related to the density and neutron log responses at such depth horizon, natural gamma ray spectral data at such depth horizon, and additional formation parameters, so as to facilitate the extrapolation of values representing the density and neutron measurements which would be yielded if such measurements were responsive essentially only to the clay contained within the formations at such depth horizons, and, if used for volume of clay determinations, would yield results equivalent to those determined through use of other log data.

These extrapolated response values are responsive to the different clay types and distributions within the formations and facilitate the determining of various formation parameters at each of the selected depth horizons in response to these different clay types and distributions and the different properties associated therewith. In a preferred embodiment, these determined parameters will include bound water and porosity data which may then be related to the resistivity measurement to determine a geophysical well log indicating fluid saturation and permeability characteristics of the formations. In addition the percent of expandable clay layers and the cation exchange capacity for the shale zones are determined.

DETAILED DESCRIPTION OF THE PREFERRED EMBODIMENT

Figures 1, 2:
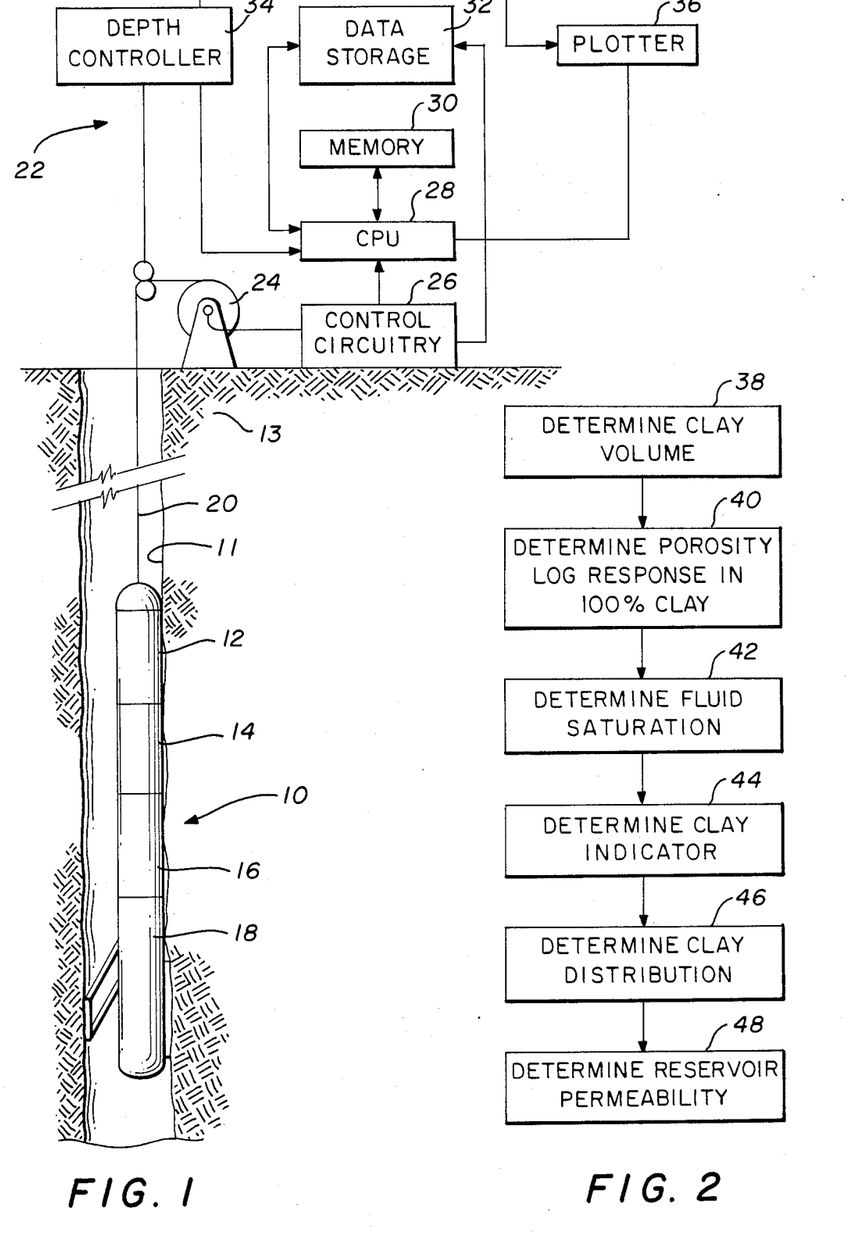
FIG. 1 illustrates a suite of logging instruments disposed within a borehole penetrating an earth formation, illustrated in vertical section, and coupled to equipment at the earth's surface in accordance with the method and apparatus of the present invention.
FIG. 2 is a functional block diagram illustrating a method determining characteristics of clay-bearing formations in accordance with the present invention.

Referring now to the drawings in more detail, particularly to FIG. 1, therein is illustrated a suite of logging instruments 10, disposed within a borehole 11 penetrating an earth formation 13, illustrated in vertical section, and coupled to equipment at the earth's surface in accordance with the method and apparatus for determining characteristics of clay-bearing formations of the present invention. Logging instrument suite 10 preferably includes a resistivity device 12, a natural gamma ray device 14, and two porosity-determining devices, preferably a neutron device 16 and a density device 18. Resistivity device 12 may be one of a number of different types of instruments known to the art for measuring the electrical resistivity of formations surrounding a borehole so long as such device has a relatively deep depth of investigation. For example, a device such as that described in U.S. Pat. No. 3,772,589 issued Nov. 13, 1973 to Scholberg or as that described in U.S. Pat. No. 3,329,889 issued July 4, 1967 to Tanguy is appropriate for usage with the present invention. Natural gamma ray device 14 is preferably of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. Neutron device 16 may be one of several types known to the art for using the response characteristics of the formation to neutron radiation to determine formation porosity, for example, a device such as that described in U.S. Pat. No. 3,483,376 issued Dec. 9, 1969 to S. Locke et al. Such a device is essentially responsive to the concentration of hydrogen atoms within the formation. Density device 18 is preferably a conventional gamma-gamma density instrument such as that described in U.S. Pat. No. 3,321,625 issued May 23, 1967 to J. S. Wahl, used to determine the bulk density of the formation.

Instrument suite 10 is supported within borehole 11 by a cable 20 containing electrical conductors (not illustrated) for communicating electrical signals between instrument suite 10 and the surface electronics, indicated generally at 22, located at the earth's surface. Logging devices 12, 14, 16 and 18 within instrument suite 10 are cooperatively coupled such that electrical signals may be communicated between each device 12, 14, 16 and 18 and surface electronics 22. Cable 20 is attached to a drum 24 at the earth's surface in a manner familiar to the art. Instrument suite 10 is caused to traverse borehole 11 by spooling cable 20 on to or off of drum 24, also in a manner familiar to the art.

Surface electronics 22 includes such electronic circuitry as is necessary to operate devices 12, 14, 16 and 18 within instrument suite 10 and to process the data therefrom. Control circuitry 26 contains such power supplies as are required for operation of the chosen embodiments of logging devices within instrument suite 10 and further contains such electronic circuitry as is necessary to process and normalize the signals from such devices 12, 14, 16 and 18 in a conventional manner to yield generally continuous records, or logs, of data pertaining to the formations surrounding borehole 11. These logs are then preferably electronically stored in data storage 32 prior to processing in accordance with methods such as those to be described later herein. Control circuitry 26 preferably further contains electronic circuitry, such as that described in U.S. Pat. No. 4,271,356 issued June 2, 1981 to Groeschel et al, for separating radiation measurements from natural gamma ray device 14 into individual energy bands centered about energy peaks of selected elemental sources of radiation, preferably the energy peaks of potassium, uranium and thorium.

Surface electronics 22 may also include such equipment as will facilitate machine implementation of the method of the present invention. Central processing unit (CPU) 28 may be of various forms but preferably is an appropriate digital computer programmed to process data from logging devices 12, 14, 16 and 18 in accordance with a methods such as will be described later herein. Memory unit 30 and data storage unit 32 are each of a type to cooperatively interface with CPU 28 and/or control circuitry 26. Depth controller 34 determines the longitudinal movement of instrument suite 10 within borehole 11 and communicates a signal representative of such movement to CPU 28 and plotter 36. Plotter 36 may be of a variety of forms suitable for receiving signals from CPU 28 and depth controller 34 and recording them as a function of depth. Although logging devices 12, 14, 16 and 18 are illustrated as component parts of instrument suite 10 to be traversed through borehole 11 simultaneously, it is to be understood that logging devices 12, 14, 16 and 18 may be traversed through borehole 11 individually or in subcombinations and the signals therefrom stored in data storage 32 until such time as all necessary data is obtained. It is to be appreciated that processing of such data in accordance with the present invention may occur at the wellsite or at a remote time and/or location.

Referring now also to FIG. 2 of the drawings, therein is illustrated in block diagram form a method of evaluating characteristics of clay-bearing formations in accordance with the present invention. It will be appreciated that these steps are preferably performed generally continuously, over a plurality of selected depth increments, on the basis of the data obtained from logging devices 12, 14, 16, and 18 so as to evaluate the desired formation parameters throughout the vertical extent of the formations of interest. For purposes of illustration, the present invention will be discussed in context of determining parameters of shaly sand reservoirs, typically considered to be those reservoirs composed of formations containing a sand matrix and further containing greater than approximately 5% clay; however, it is to be understood that the present invention may also be utilized to determine parameters of clay-bearing formations having a rock matrix other than sand, but having a consistent known or determinable matrix density, or of clay-bearing formations through which the rock matrix density may be generally continuously evaluated.

The volume of clay within the reservoir formations is first determined 38. In a preferred embodiment, natural gamma ray spectral data will be utilized in making this determination, in a manner to be described later herein, because such data facilitates an optimal clay volume determination unaffected by silt content within the formations. Alternatively, several other methods of clay volume determination are known to the art and may be utilized in accordance with the present invention, however, because in a preferred embodiment this volume of clay determination will be related to a correlation of data from the two porosity devices, i.e., from neutron and density log data, such volume of clay determination should preferably be independent of data obtained from such neutron and density devices 16 and 18.

As stated earlier herein, clay types and distributions may change continually throughout the extent of a reservoir and may affect different reservoir properties differently. Similarly, different types of logging devices will respond differently to these different clay types and distributions. The determined volume of clay at a given depth horizon may be related to correlated neutron and density log data at such depth horizon, and also, preferably, to natural gamma ray spectral data, so as to determine the true response as would be indicated on neutron and density logs relating to formations containing 100% concentrations of clay 40, such 100% clay concentrations having a composition of clay types essentially proportional to the relative composition of clay types present within the actual determined clay volume, i.e., to extrapolate density and neutron log data as if the density and neutron instruments (18 and 16 in FIG. 1) were responsive essentially only to the clay within the formation. Through this log response determination, variations in clay types and distributions and the accompanying variations in reservoir characteristics, including reservoir porosity and characteristics related thereto, may be evaluated with improved accuracy. In particular, through use of these generally continuously determined neutron and density log responses in 100% clay and parameters determined therefrom, a geophysical model may be utilized to determine formation fluid saturation 42 throughout the vertical extent of a reservoir.

In a preferred embodiment of the invention, an indicator of clay types present within the reservoir is determined 44. Although no precise log-derived determinator of clay types is commonly known, it has been found that a ratio of the cation exchange capacity (CEC) of the formation to the hydrogen index in dry shaly sand ($HI_{dss}$) may provide a good estimation of the principal clay types encountered within the reservoir. Although the determination of each of these terms will be described in more detail later herein, it is to be appreciated that terms CEC and $HI_{dss}$ are determined 44 in response to the neutron and density log responses in 100% clay previously determined 40.

The type of clay distribution within the reservoir formations will have a significant bearing upon the effective porosity and permeability, and hence of the productivity, of shaly sand reservoirs. There are three modes in which clay may be distributed within the reservoir formations; structural, dispersed, and laminated. Structural clay replaces only the sand matrix and therefore has no direct effect on reservoir porosity, dispersed clay fills only the interstitial formation pore volume, thereby reducing the effective reservoir porosity, while laminated clay both replaces the sand matrix and fills interstitial pore volume, in proportion to the relative amounts of each contained within the formation, again reducing reservoir porosity. The modes of clay distribution may be determined 46 in response to the volume of clay and reservoir porosity data in a manner to be described later herein.

The fluid saturation characteristics determined above, particularly the water saturation, may be related to porosity-derived formation data to determine permeability characteristics of the reservoir 48. The absolute, relative, and effective permeabilities of the reservoir formations may be evaluated for both hydrocarbons and water in response to this generally continuous water saturation determination to better evaluate the producibility of the reservoir.

Figure 3A:
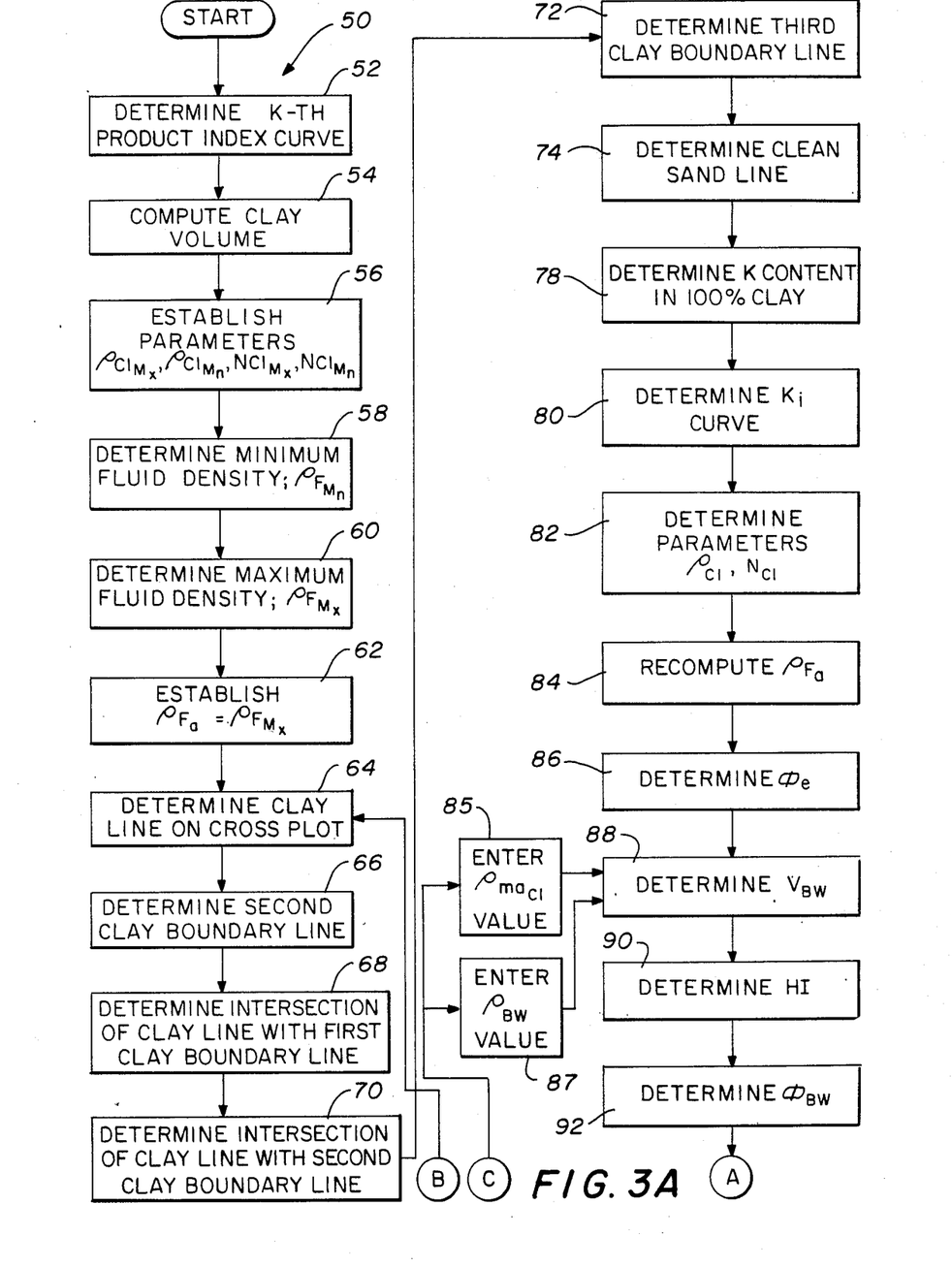
FIGS. 3A-C illustrates a logic flow diagram exhibiting the method of FIG. 2.
Figure 3B:
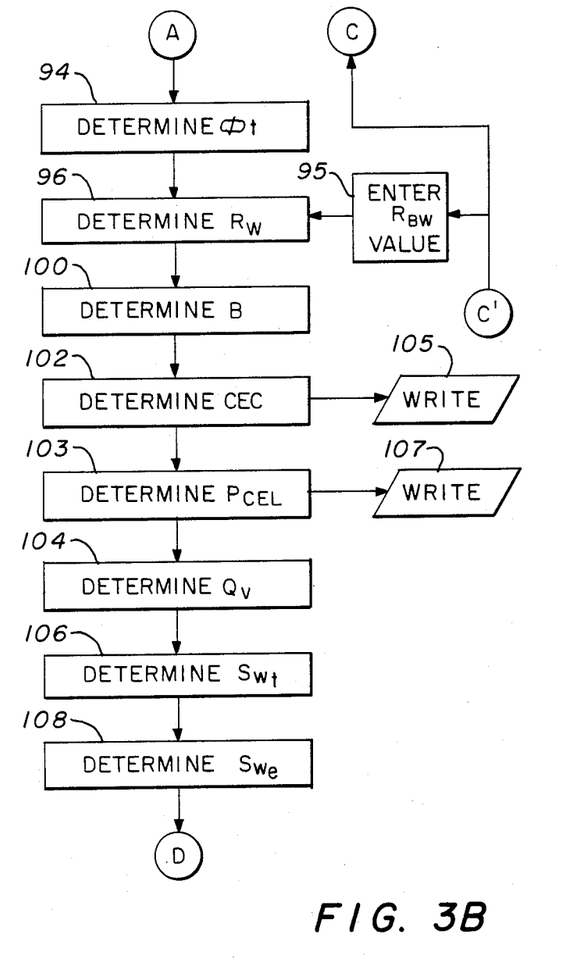
Figure 3C:
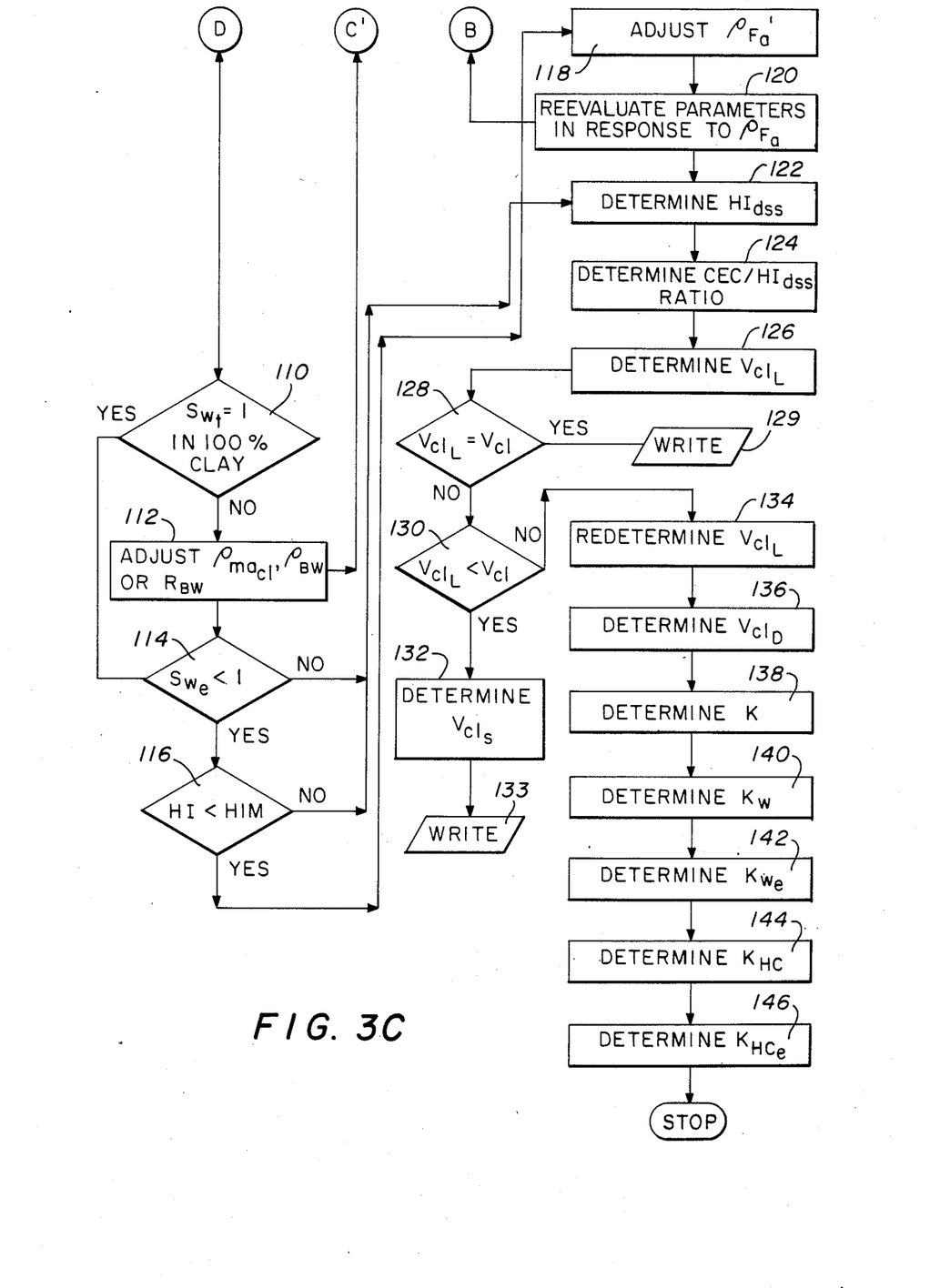

Referring now to FIGS. 3A-C of the drawings, therein is illustrated a logic flow diagram of a preferred embodiment of a method of determining characteristics of clay-bearing formations in accordance with the present invention, such as the method discussed previously herein with respect to FIG. 2. Such a method will preferably be used to evaluate reservoir characteristics after the log data previously described herein has been accumulated and normalized in a manner familiar to the art.

As stated earlier herein, natural gamma ray spectral data will preferably be used to determine the volume of clay contained within the reservoir formations. Clays contain significant amounts of potassium, uranium, and thorium and therefore exhibit a natural radioactivity. Shaly sand formations also, however, may contain non-clay mineral components, such as silt, exhibiting significant radioactivity due to uranium concentrations therein. Techniques of natural gamma ray spectral logging such as that discussed and referenced earlier herein have the capability of determining the individual quantitative contributions of potassium, uranium, and thorium to the natural formation radioactivity, thereby facilitating the exclusion of the uranium contribution and further facilitating a measurement of formation radioactivity essentially independent of the silt content of the formation.

Figure 4:
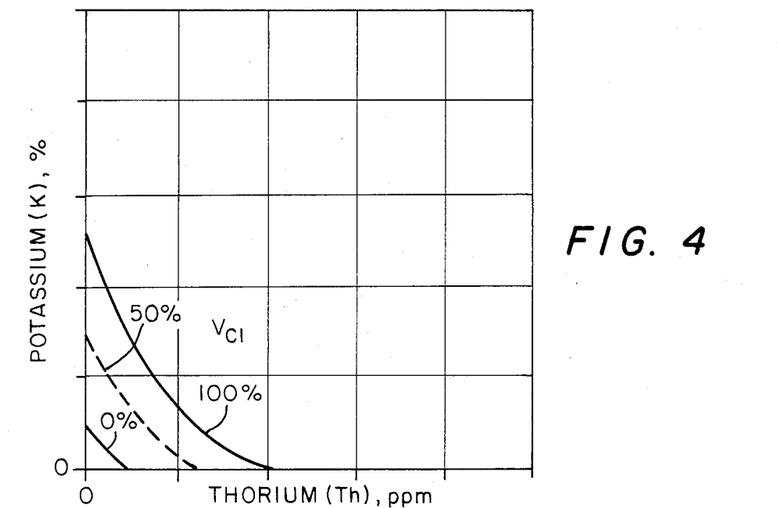
FIG. 4 illustrates a crossplot of potassium and thorium content within clay-bearing formations.

Referring now also to FIG. 4 of the drawings, therein is illustrated a crossplot of potassium and thorium content within clay-bearing formations. It has been found that while potassium and thorium contents vary for different types of clays, the potassium and thorium concentrations in clay-bearing formations tend to form a hyperbolic pattern on a potassium-thorium content crossplot, the distance of the hyperbola from the origin of the crossplot being indicative of the volume of clay within a formation. A product index (PI) curve may be calculated (step 52 in FIG. 3A) on the basis of this crossplot in accordance with the relation:

$$PI = (K + a)(Th + b) \quad (1)$$

where K represents the measured potassium contribution at a given depth horizon within the borehole, Th represents the measured thorium contribution at such depth horizon, and a and b represent zero offset constants calculated from the potassium-thorium crossplot. The product index curve may then be used to determine the clay volume ($V_{cl}$) (step 54 in FIG. 3A) at each selected depth horizon within the formation:

$$V_{cl} = (S_{log} - S_{Mn})/(S_{Mx} - S_{Mn}) \quad (2)$$

where $S_{log}$ represents the product index curve value at a given depth horizon, and $S_{Mx}$ and $S_{Mn}$ represent product index curve values indicative of maximum and minimum volumes of clay, respectively, within the reservoir, as may be determined through techniques familiar to the log analysis art.

Figure 5:
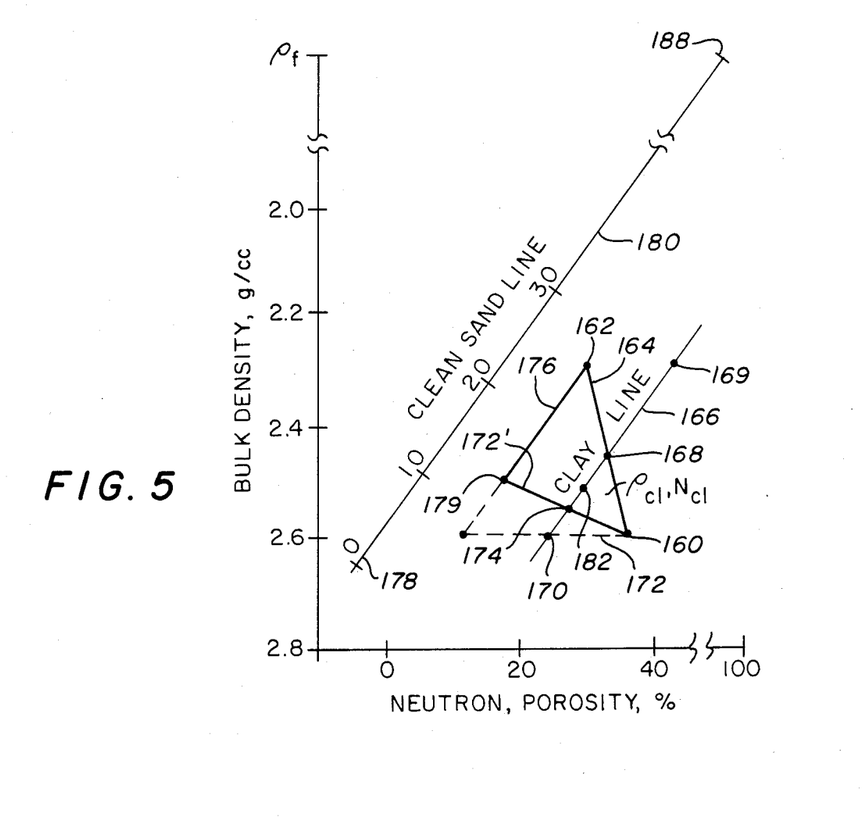
FIG. 5 illustrates a crossplot of neutron ad density log responses in clay-bearing formations along with determined formation parameters.

Referring now to FIG. 5 of the drawings, therein is illustrated a density-neutron crossplot of a type known to the art for correlation log data. It is to be understood that although a crossplot is utilized in the practice of the preferred embodiment of the present invention and is shown for purposes of illustration thereof, a crossplot is not essential to the practice of the present invention and it will be obvious to persons skilled in the art that mathematical equivalents may be substituted therefor. A determination is first made of the neutron response values representative of maximum and minimum volumes of clay from the neutron log, $N_{clMx}$ and $N_{clMn}$, respectively, and the density response values representative of maximum and minimum volumes of clay from the density log, $\rho_{clMx}$ and $\rho_{clMn}$, respectively, such maximum/minimum determinations again being made through techniques familiar to the log analysis art. Utilizing these parameters, points 160 and 162 may be established (step 56 in FIG. 3A) on the density-neutron crossplot point 160 having coordinates ($N_{clMx}$, $\rho_{clMx}$), and, point 162 having coordinates ($N_{clMn}$, $\rho_{clMn}$), and, a first clay boundary line 164 may then be located therebetween. The minimum density of the fluid contained within the formation ($\rho_{fMn}$) may then be determined (step 58 in FIG. 3A) in response to these parameters:

$$\rho_{fMn} = \frac{\rho_{ma}(N - V_{cl} \cdot N_{clMx})}{\rho_{ma} - \rho - V_{cl}(\rho_{ma} - \rho_{clMx}) + (N - V_{cl} \cdot N_{clMx})} \quad (3)$$

where $\rho_{ma}$ represents the density of the clean formation rock matrix, in the present example a sand matrix which may typically be assumed to have a density of 2.65 g/cc, N is the neutron log response at a given depth horizon within the well, and $\rho$ is the density log response at such depth horizon, this depth horizon preferably being that at which said clay volume was determined (step 54 in FIG. 3A). The maximum density of the formation fluid ($\rho_{fMx}$) is then determined (step 60 in FIG. 3A) in a similar manner:

$$\rho_{fMx} = \frac{\rho_{ma}(N - V_{cl} \cdot N_{clMn})}{\rho_{ma} - \rho - V_{cl}(\rho_{ma} - \rho_{clMn}) + (N - V_{cl} \cdot N_{clMn})} \quad (4)$$

For purposes of initial computations, the apparent fluid density ($\rho_{fa}$) is established equivalent to the maximum fluid density ($\rho_{fMx}$) (step 62 in FIG. 3A).

Utilizing this apparent fluid density, a clay line 166 is determined (step 64 in FIG. 3A) on the density-neutron crossplot. A first neutron log response value ($N_{clx}$) is calculated in response to the minimum density response value in 100% clay ($\rho_{clMn}$) to determine one coordinate of a clay line indicative of log responses within a 100% clay volume on the crossplot (shown for exemplary purposes by 166):

$$N_{clx} = \frac{N - [\rho_{fa}(\rho_{ma} - \rho_{fa})^{-1}][\rho_{ma} - \rho - V_{cl}(\rho_{ma} - \rho_{clMn})]}{V_{cl}} \quad (5)$$

A second neutron response value ($N_{cly}$) is then calculated in response to the maximum density response value in 100% clay ($\rho_{clMx}$) to determine a second coordinate of clay line 166:

$$N_{cly} = \frac{N - [\rho_{fa}(\rho_{ma} - \rho_{fa})^{-1}][\rho_{ma} - \rho - V_{cl}(\rho_{ma} - \rho_{clMx})]}{V_{cl}} \quad (6)$$

Clay line 166 may then be determined on the crossplot by points 169 and 170, located by coordinate pairs ($N_{clx}$, $\rho_{clMn}$) and ($N_{cly}$, $\rho_{clMx}$) respectively. Point 170 on the crossplot, located by coordinate pair ($N_{cly}$, $\rho_{clMx}$), may be viewed in relation to point 160, having coordinates ($N_{clMx}$, $\rho_{clMx}$), to determine (step 66 in FIG. 3A), at least initially, second clay boundary line 172.

Essentially all density and neutron log response values exhibited within reservoir formations composed of 100% clay, regardless of clay type, should be closely contained within the area on the density-neutron crossplot defined between first clay boundary line 164 and second clay boundary line 172. If examination of log data indicates that the parallel relation of second clay boundary line 172 to the ordinate axis tends to encompass too great an area, it will be preferable to correlate the density-neutron crossplot with the volume of clay indicator, in the preferred embodiment the product index curve, in a manner known to the art, such as by a numerical Z-axis plot of the clay volume indicator relative to the density-neutron crossplot. This correlation should indicate the density and neutron log response coordinates on the crossplot at which a 100% clay content is indicated. Upon examination of the Z-axis plot or other correlation, second clay boundary line 172 may be relocated 172' such that the response coordinates at which a 100% clay composition of the reservoir formations is indicated are closely bounded thereby.

Next, the intersection 168 of clay line 166 with first clay boundary line 164 is determined (step 68 in FIG. 3A), such intersection 168 defined by coordinate pair ($N_{cl1}$, $\rho_{cl1}$). Similarly, the intersection 174 of clay line 166 with second clay boundary line 172' is determined (step 70 in FIG. 3A), such intersection 174 defined by coordinate pair ($N_{cl2}$, $\rho_{cl2}$).

A third clay boundary line 176 and a clean sand line 180 may also be determined (steps 72 and 74 in FIG. 3A) for a graphical representation of clay parameters. Third clay boundary line 176 will extend from point 162 previously established and will have a slope equal to the slope of clay line 166. Third clay boundary line 176 should intersect 179 second clay boundary line 172' and thereby enclose the area containing essentially all points representing density and neutron log responses in formations of 100% clay. Clean sand line 180 represents density and neutron log response values in formations which are essentially free of clay. If the ordinate axis of the crossplot is scaled in limestone porosity units, clean sand line 180 will extend from a point having coordinates proximate (−4, 2.65) and will also have a slope equal to that of clay line 166. It will be appreciated that the slope of clay line 166, and, therefore the slopes of both third clay boundary line 176 and clean sand line 180, are functionally related to the density of the fluid within the formation, clean sand line 180 also having a second determinative endpoint with a neutron log-determined porosity coordinate of 100% and a density log-determined coordinate equal to the density of the formation water.

Points 160, 162, and 179 at the three corners of the triangle found by first, second, and third clay boundary lines 164, 172' and 176 are each representative of approximate density and neutron log responses within environments composed of different clay groups. For example, examining responses indicated by coordinates located within the triangle, responses proximate point 160 are generally representative of clays of either the chlorite group or the kaolinite group, responses proximate point 162 are generally indicative of clays within the smectite or montmorillonite group, while responses proximate point 179 are generally representative of clays of the illite group. Because clays of the illite group are known to contain almost thirty times the volume of potassium contained within smectite clays, the potassium (K) curve utilized earlier herein in the volume of clay determination (step 54 in FIG. 3A) may now be utilized in conjunction with the determined volume of clay to evidence the relative proportions of each group within the determined volume of clay and to define parameters $N_{cl}$ and $\rho_{cl}$ representing the response values of the neutron and density logs, respectively, if such logs were responsive essentially only to the clay types within the formation as discussed earlier herein. The potassium (K) curve is first utilized along with the $V_{cl}$ curve to determine a curve of the potassium content ($K_c$) in 100% clay (step 78 in FIG. 3A), according to the relation:

$$K_c = (K/V_{cl}) \tag{7}$$

The potassium content values expressed therein are then utilized to determine a potassium index ($K_i$) curve (step 80 in FIG. 3A):

$$K_i = (K_c - K_{Mn})/(K_{Mx} - K_{Mn}) \tag{8}$$

where $K_{Mx}$ and $K_{Mn}$ represent the maximum and minimum values, respectively, of the potassium content ($K_c$) curve, such maximum/minimum determinations, again made in a manner familiar to the log analysis art. Parameters $N_{cl}$ and $\rho_{cl}$ (shown for exemplary purposes at 182) may then be determined (step 82 in FIG. 3A) in response to the potassium index ($K_i$) curve and the coordinates of the points of intersection, 168 and 174, of clay line 166 with first boundary line 164, ($N_{cl1}$, $\rho_{cl1}$), and with second clay boundary line 172', ($N_{cl2}$, $\rho_{cl2}$):

$$N_{cl} = N_{cl1} + (N_{cl2} - N_{cl1})(K_i) \tag{9}$$

and $$\rho_{cl} = \rho_{cl1} + (\rho_{cl2} - \rho_{cl1})(K_i) \tag{10}$$

It is to be appreciated that because terms $N_{cl}$ and $\rho_{cl}$ represent different instrument response values within a possibly hypothesized environment of 100% clay, such response differences being due to, and indicative of, variations in the relative proportions of different clay types within the formations, these terms will preferably be determined generaly continuously, at selected incremental depth horizons within the zone of interest in the reservoir, as will parameters to be determined in relation to these response values, as will be described later herein.

Terms $N_{cl}$ and $\rho_{cl}$ thus determined are then utilized to reevaluate the apparent fluid density ($\rho_{fa}'$) (step 84 in FIG. 3A):

$$\rho_{fa}' = \frac{\rho_{ma}(N - (V_{cl} \cdot N_{cl}))}{\rho_{ma} - \rho - V_{cl}(\rho_{ma} - \rho_{cl}) + (N - V_{cl} \cdot N_{cl})} \tag{11}$$

This reevaluated fluid density ($\rho_{fa}'$) may then be utilized to determine a curve of the effective porosity ($\phi_e$) (step 86 in FIG. 3A) of the reservoir formations, the effective porosity representing that portion of the formation pore volume not occupied by bound water:

$$\phi_e = \frac{\rho_{ma} - \rho - V_{cl}(\rho_{ma} - \rho_{cl})}{\rho_{ma} - \rho_{fa}} \tag{12}$$

Figure 6:
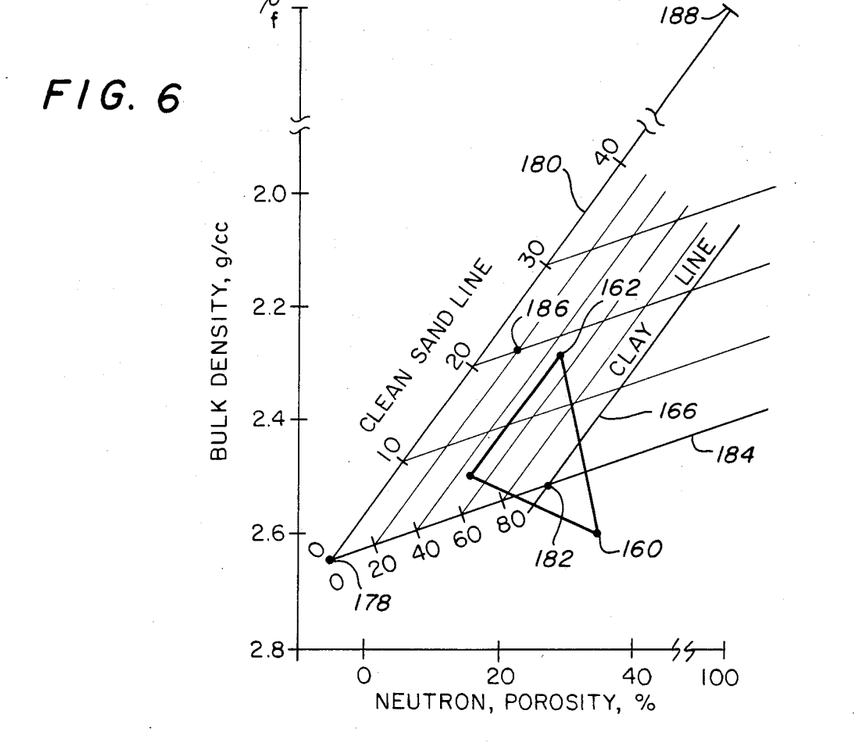
FIG. 6 illustrates the crossplot of FIG. 5 adapted for graphic determination of additional formation characteristics.

Referring now to the density-neutron crossplot of FIG. 6, this effective porosity may also be determined graphically. A linear porosity scale between 0 and 100% may be established relative to clean sand line 180 between first end 178, representing zero porosity, and second end 188, representing 100% porosity. A line 184 located from the zero porosity end 178 of clean sand line 180 through point 182 as determined by coordinate pair ($N_{cl}$, $\rho_{cl}$) will evidence zero porosity. All lines drawn on the crossplot parallel to this zero porosity line 184 and intersecting clean sand line 180 will be indicative of a single formation effective porosity value, such value determined at the point of intersection with clean sand line 180 and the scale located thereon, in a manner known to the art. One of these parallel lines passing through a point on the crossplot with coordinates of the density and neutron log responses at a point within the well, for example, point 186, indicates the effective porosity ($\phi_e$) at such point within the well at the point at which such line intersects clean sand line 180, in this example, indicating 20% effective porosity. Similarly, lines drawn parallel to clean sand line 180 will be indicative of the clay volume within the formation. Point 182 on clay line 166 will be indicative of 100% clay volume and point 178 on clean sand line 180 will be indicative of essentially 0% clay volume with a linear scale between points 178 and 182 establishing the clay volume; in the example of point 186, a 20% clay volume. Thus, it will be appreciated that the scale for the clay volume will vary in response to the position of point 182 determined by coordinate pair ($N_{cl}$, $\rho_{cl}$) at each selected depth horizon.

Referring now just to FIG. 3A, as stated earlier herein, in a clay-bearing formation a portion of the water contained therein will electrochemically interact with the clay minerals so as to become electrically oriented and physically bound thereto. A curve representative of the volume of bound water within a formation composed of 100% clay, in types and proportions functionally equivalent to those within the actual clay volume, expressed as a fraction of formation volume, $V_{BW}$, may be determined 88 in response to $\rho_{cl}$:

$$V_{BW} = (\rho_{macl} - \rho_{cl})/(\rho_{macl} - \rho_{BW}) \qquad (13)$$

Where $\rho_{BW}$ represents the density of the bound water within the formation and may vary as a function of the volume of the bound water and in some cases may approach 1.4 g/cc. In the absence of any empirical data to the contrary, a value of 1 g/cc will preferably be entered 87 for $\rho_{BW}$. $\rho_{macl}$ represents the density of the dry clay matrix which is often well known for many areas and may be entered 85 accordingly. If a value for $\rho_{macl}$ is not known, a value of 2.7 g/cc will preferably be entered 85 therefore.

The hydrogen index (HI) of the dry clay may be determined 90 in response to the calculated volume of bound water in 100% clay and term $N_{cl}$:

$$HI = N_{cl} - V_{BW} \qquad (14)$$

The volume of bound water in 100% clay ($V_{BW}$) is related to the volume of bound water in the clay actually within the shaly sand formation ($\phi_{BW}$), again expressed as a fraction of total formation volume 92:

$$\phi_{BW} = V_{BW} \cdot V_{cl} \qquad (15)$$

Referring now to FIG. 3B, this shaly sand formation bound water volume ($\phi_{BW}$) may be used to determine 94 the total porosity ($\phi_t$) i.e., the total pore volume of the reservoir formations;

$$\phi_t = \phi_e + \phi_{BW} \qquad (16)$$

The formation water electrical resistivity is next determined 96 in response to data obtained through use of the resistivity device (element 12 in FIG. 1). Due to the electrochemical interaction between the bound water and the clay, the resistivity of the bound water may differ from the resistivity of the unbound, or free, water within the formation. Further, clays of the different clay groups discussed earlier herein will typically retain significantly different volumes of bound water, thereby leading to differing water resistivities dependent upon the clay types within the formations, although the electrical resistivity or conductivity of the bound water will remain essentially consistent regardless of clay types. Therefore, the different between free and bound water resistivities in clay-bearing formations and the volume of bound water within such formations should be taken into consideration when determining the formation water resistivity ($R_w$), such as may be accomplished through the relation:

$$R_w = \frac{\phi_t (R_{FW} \cdot R_{BW})}{(R_{BW} \cdot \phi_e) + (R_{FW} \cdot \phi_{BW})} \qquad (17)$$

in which $R_{FW}$ represents the resistivity of the free water within the formation and $R_{BW}$ represents the resistivity of the bound water within of the formation. Term $R_{FW}$ may be determined within a non-clay-bearing portion of the reservoir through examination of log data or through use of charts and/or nomographs in a manner known to the log analysis art. Similarly, term $R_{BW}$ should be determined within a portion of the reservoir exhibiting a 100% clay composition, also in a manner known to the log analysis art.

A term (B) is calculated 100 for use in the preferred water saturation model to represent the conductivity of exchangable clay cations as a function of the formation water resistivity ($R_w$) under subsurface conditions, such as may be achieved by the relation:

$$B = \frac{-1.28 + (0.225 \cdot T) - (.0004059 \cdot T^2)}{1 + R_w 1.23 ((0.045 \cdot T) - 0.27)} \qquad (18)$$

in which T represents the borehole temperature at the depth horizon at which the water saturation is to be determined. Borehole temperature (T) may be determined in a conventional manner in relation to the bottom hole temperature and the temperature gradient within the well, or, alternatively, a conventional temperature sensor may be included within the instrument suite (element 10 in FIG. 1) to determine the temperature empirically.

Another term required by the preferred water saturation model is the Qv of the formation, defined as the cation exchange capacity (CEC) per unit pore volume. The CEC of the formation represents the amount of cations on the clay surface which may be easily exchanged for other cations in the environment of an aqueous solution. Measurements of CEC and Qv are typically not precise determinations because of variations in measuring techniques. The prior art as typically relied at least partially upon core data to determine formation CEC. The present invention contemplates the determination of formation CEC 102 without reliance upon core data by functionally relating the previously determined volume of bound water in the shaly sand formation ($\phi_{BW}$) to established data of the functional relation of CEC to bound water must be expressed in terms of the relative weight of the water as compared to the formation rock, i.e., grams of bound water per 100 grams of rock:

$$B_w = \frac{100 \, (\phi \, B_w)}{[\rho_{ma}(1 - V_{cl}) + \rho_{macl} \cdot V_{cl}](1 - \phi_t)} \quad (19)$$

This bound water by weight ($B_w$) may then be utilized to determine CEC 102:

$$CEC = \frac{B_w}{0.084 \, C_o - 0.5 + 0.22} \quad (20)$$

in which $C_o$ represents the salinity of a formation equilibrating sodium chloride solution, expressed in units of equivalent liters$^{-1}$, which is functionally related to the water resistivity ($R_w$) and the borehole temperature and may be determined therefrom in a conventional manner.

The derived value of cation exchange capacity of the shale formations may then be used to determine the percent of expandable layers, PCEL, 103 of the shale formation. The percent of expandable layers is determined in accordance with the relationship:

$$PCEL \cdot K = \left(\frac{CEC}{V_{cl}}\right) - C \quad (20a)$$

which can be rewritten as:

$$PCEL = \frac{1}{K}\left[\left(\frac{CEC}{V_{cl}}\right) - C\right] \quad (20b)$$

in which PCEL represents the percent of expandable clay layers of the shale formation, and C and K are constants based on the direct proportionality of the cation exchange capacity to the percent expandable layers. In the preferred embodiment C=8.2 and K=0.54.

The cation exchange capacity and percent expandable layers for the shale formations are outputted 105 and 107, respectively, for storage or presentation by plotter 36. These log-derived determinations of clay properties of the shale formation are used to provide information on a substantially continuous basis related to clay diagenesis, onset of overpressures, borehole stability of the shale formations and hydrocarbon distribution versus clay dehydration. The Qv of the formation may similarly be calculated 104:

$$Q_v = \frac{\phi \, BW \cdot \phi_t^{-1}}{0.084 \, C_o - 0.5 + .022} \quad (21)$$

The above-described parameters may now be utilized in the preferred water saturation model 106:

$$S_{wt}{}^n = \frac{F \cdot R_w}{R_t(1 + R_w \cdot B \cdot Q_v \cdot S_{wt}^{-1})} \quad (22)$$

in which $S_{wt}$ represents the total water saturation of the reservoir expressed as a fraction of total porosity, n is the saturation exponent which has a value typically within the range 1.6 to 2.4 and in the absence of additional data may be considered to have a value of 2, $R_t$ is the true formation resistivity as determined in a conventional manner from the resistivity device (element 12 in FIG. 1), and F is a formation factor as determined from the relation:

$$F = \frac{A}{\phi_t{}^m} \quad (23)$$

wherein A is a constant, preferably having a value of 0.62 and m is a cementation factor preferably having a value of 2.15. The total water saturation ($S_{wt}$) so determined may then be used to compute the effective water saturation ($S_{we}$) of the formation 108:

$$S_{we} = 1 - \frac{(1 - S_{wt}) \phi_t}{\phi_e} \quad (24)$$

After determining the effective water saturation of the reservoir formations it is preferable to examine such determinations for unlikely indications of formation conditions 110. For example, if a formation exhibits a 100% volume of clay while the total water saturation ($S_{wt}$) indicated for the formation is less than 100%, it may be an indication that the entered value for the density of the clay matrix ($\rho_{macl}$) is too high, the assumed density of the bound water ($\rho_{BW}$) is too low, and/or the resistivity of the bound water ($R_{BW}$) is too low and should be adjusted 112 by means of examination and comparison of accumulated data regarding the reservoir known to the log analysis art. Conversely, an indication of more than 100% total water saturation in formations composed of 100% clay may indicate that the input value of the density of the clay matrix ($\rho_{macl}$) is too low, the density of the bound water ($\rho_{BW}$) is too high, and/or the resistivity of the bound water ($R_{BW}$) is too high, and should be adjusted 112 in a similar manner.

Gas bearing zones may introduce error into the determined total and effective water saturations. It is therefore preferable to minimize this error, such as through use of the previously determined hydrogen index (HI). The effective water saturation ($S_{we}$) is examined 114. If $S_{we}$ is not less than one 114, it is assumed that no correction is necessary. If $S_{we}$ is less than one 114 the determined hydrogen index (HI) at that depth horizon is compared 116 to the hydrogen index in an adjacent water-bearing zone, which will be considered to be the minimum hydrogen index (HIM). If HI is not less than HIM 116 it is again assumed that no correction is needed. If HI is less than HIM 116, then the reevaluated apparent fluid density $\rho_{fa}'$ is adjusted 118 such as by the relation:

$$\rho_{fa}{}'' = (\rho_{fMn} \cdot \rho_{fc}) + (\rho_{fMx}(1 - \rho_{fc})) \quad (26)$$

where $\rho_{fa}''$ is the adjusted apparent fluid density, and $\rho_{fc}$ is a correction factor, preferably ranging between zero and one, the precise value of which is chosen so as to make HI as close to equal to HIM as is possible within such limits upon $\rho_{fc}$. If $\rho_{fa}'$ was adjusted 118 then this adjusted value ($\rho_{fa}''$) should be used to reevaluate the formation parameters 120 in the manner described earlier herein.

Utilizing information previously determined, an indicator of the clay types within the reservoir formations may be determined. As stated earlier herein, it has been found that a ratio of the CEC of a shaly sand formation to the HI of the dry shaly sand ($HI_{dss}$) will generally exhibit significantly different values dependent upon and indicative of the clay type or types within the shaly sand. For example, in kaolinite the $CEC/HI_{dss}$ ratio (124 in FIG. 3C) may range from 0.08 to 0.4 with the average ratio being 0.25, while in chlorite the ratio may range from 0.3 to 1.1 with an average of 0.7. Similarly, illite may typically exhibit $CEC/HI_{dss}$ ratios between 0.8 and 3.3 with an average of 2.1 while montmorillonite will have an average value of 8.8 within a range of 6.1 to 11.5. Term $HI_{dss}$ is a function of the HI of dry clay and the volume of clay within the formation and may be determined 122 by the relation:

$$HI_{dss} = HI \cdot V_{cl} \qquad (26)$$

As stated earlier herein, although this ratio is not an absolute means of clay typing, the significant disparity between average $CEC/HI_{dss}$ ratio values may typically be an indicator of clay types present within the formations.

The volume of clay ($V_{cl}$) and effective and total porosity determinations, $\phi_e$ and $\phi_t$, respectively, described earlier herein may be utilized to determine the mode or modes of clay distribution within the reservoir. By definition, the three modes of clay distribution described earlier herein may occur either individually, or, laminated clay may be found with dispersed clay or with structural clay, but not with both. If only laminated clay is present in the reservoir formations then the volumes of such ($V_{clL}$) may be determined 126 from porosity data:

$$V_{clL} = [(\phi_{max} - \phi_e)/\phi_{max}] \qquad (27)$$

where $\phi_{max}$ equals the maximum effective formation porosity determined within the formations. The determined volume of laminated clay ($V_{clL}$) is then compared 128 to the previously determined total volume of clay ($V_{cl}$). If $V_{clL}$ is equal to $V_{cl}$ then all clay within the formation is laminated. If $V_{clL}$ is less than $V_{cl}$ 130, then structural clay ($V_{clS}$) must also be present within the formation, the volume of which may be determined 132:

$$V_{clS} = V_{cl} - V_{clL} \qquad (28)$$

If the calculated $V_{clL}$ is greater than $V_{cl}$ then both dispersed and laminated clays must be present within the reservoir and the $V_{clL}$ determined is erroneous and must be recalculated ($V_{clL}'$) 134:

$$V_{clL} = \frac{[V_{cl} - (\phi_{max} - \phi_e)]}{1 - \phi_{max}} \qquad (29)$$

The volume of dispersed clay ($V_{clD}$) may then be determined 136 in reference to such $V_{clL}'$ value:

$$V_{clD} = V_{cl} - V_{clL}' \qquad (30)$$

The producibility of a reservoir is highly dependent upon the permeability of the reservoir formations to both water and hydrocarbons. Three major permeability determinations are particularly useful in evaluating the producibility of a formation; the absolute permeability, the relative permeability, and the effective permeability. The absolute permeability represents the permeability of the formation with only one fluid within the formation pore volume. The relative permeability of a formation to a fluid is the permeability of the formation to a fluid expressed as a function of the saturation of the formation by that fluid, while the effective permeability is the permeability of a formation to one fluid when another fluid is present, thereby reducing the effective pore space within the formation. It is preferable that the relative and effective formation permeabilities be calculated with respect to both water and hydrocarbons so as to optimize producibility evaluations. The absolute permeability (k) of the formation may be determined 138 in response to porosity data determined in a manner previously described herein:

$$k = 0.136 \phi_e^{4.4} (S_{wi})^{-2} \qquad (31)$$

where $S_{wi}$ represents the irreducible water saturation of the formation, as may be determined from the relation:

$$S_{wi} = S_{wie} + S_{BW} \qquad (32)$$

where $S_{wie}$ represents the irreducible water saturation within the effective pore space of the formation and may be considered to be a constant and $S_{BW}$ represents the volume of bound water ($V_{BW}$) within the formation expressed in terms of percentage of formation saturation:

$$S_{BW} = \frac{V_{BW}}{\phi_t} (100) \qquad (33)$$

The relative permeability of the formation to water ($k_w$) may be determined 140 by the relation:

$$k_w = \sigma (1.83 - 1.33 \, \rho_{Hc}) \cdot (S_{we})^3 \qquad (34)$$

where $\sigma$ is a function of the total water saturation ($S_{wt}$) and the irreducible water saturation ($S_{wi}$):

$$\sigma = \frac{(S_{wt} - S_{wi})}{(1 - S_{wi})} \qquad (35)$$

and $\rho_{Hc}$ represents the density of the hydrocarbons within the formation as may be determined from the relation:

$$\rho_{Hc} = \frac{\rho'_{fa} - S_{we}}{1 - S_{we}} \qquad (36)$$

The effective permeability of the formation to water ($k_{we}$) may then be determined 142:

$$k_{we} = k \cdot k_w \qquad (37)$$

Similarly, the relative permeability of the formation to hydrocarbons ($k_{Hc}$) may be determined 144:

$$k_{Hc} = (1 - \sigma)(1 - \sigma 0.25 \cdot S_{we} 0.5) 2 \rho_{Hc} \qquad (38)$$

and the effective permeability of the formation to hydrocarbons determined 146 in response thereto:

$$k_{Hce} = k \cdot k_{Hc} \qquad (39)$$

It is to be understood that any of the determined formation parameters described herein may be recorded, such as by the plotter (element 36 in FIG. 1), either in whole or in part, as an independent curve or an equivalent thereof upon the log of the well. It is further to be understood that additional formation parameters may be determined in response to $N_{cl}$ and/or $\rho_{cl}$ or parameters determined therefrom without departing from the scope of the present invention.

In an alternative but less statistically accurate method of practicing the present invention, terms $N_{cl}$ and $\rho_{cl}$ may be evaluated in reference to the different volumes of bound water retained by clays of the different groups rather than through reference to the potassium content within the clays. Because montmorillonite retains a significantly greater volume of bound water than does illite, an index of the bound water content within the determined clay volume may be utilized to evaluate $N_{cl}$ and $\rho_{cl}$.

Figure 7:
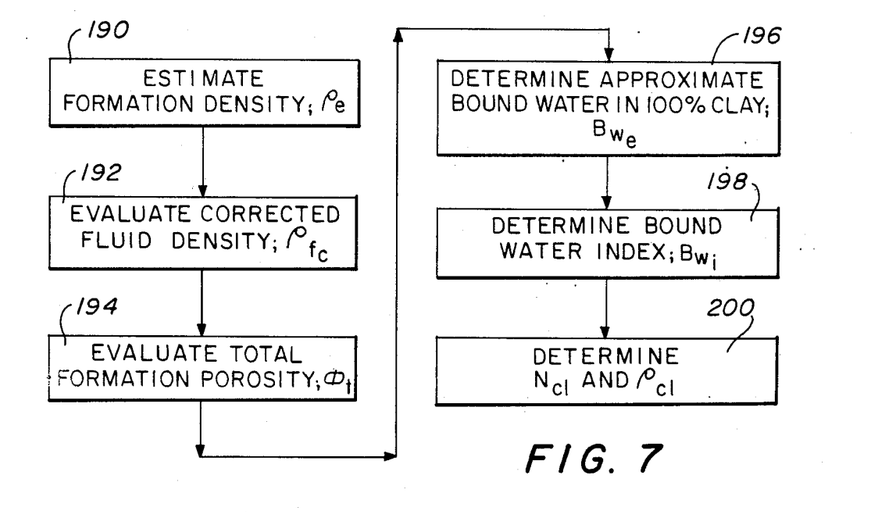
FIG. 7 is a functional block diagram illustrating an alternative method of determining characteristics of clay-bearing formations in accordance with the present invention.

Referring now to FIG. 7, the volume of clay is again determined, either through the product index curve or through other methods as discussed earlier herein. The apparent fluid density ($\rho_{fa}$), points 160 and 162, first and second clay boundary lines 164 and 172', and clay line 166 are established in response to the neutron and density log data in the manner discussed in reference to FIG. 3A. Utilizing the parameters relating to the densities of the clean formation rock matrix and the formation dry clay, $\rho_{ma}$ and $\rho_{cld}$, respectively, and the determined volume of clay, as estimation may be made of the average formation matrix density ($\rho_e$) 190:

$$\rho_e = \rho_{ma}(1 - V_{cl}) + (\rho_{cld} \cdot V_{cl}) \tag{40}$$

A corrected fluid density ($\rho_{fc}$) is then evaluated 192 in response to the apparent fluid density ($\rho_{fa}$) and the determined clay volume:

$$\rho_{fc} = \rho_{fa}(1 - V_{cl}) + (V_{cl} \cdot \rho_{BW}) \tag{41}$$

where $\rho_{BW}$, as with the previous embodiment, represents the density of the bound water within the formations and, in the absence of contrary data, will be assumed to have a volume of 1 g./cc.

The total formation porosity is then evaluated 194:

$$\phi_t = (\rho_e - \rho)/(\rho_e - \rho_{fc}) \tag{42}$$

A curve of the estimated volume of bound water within 100% clay ($Bw_e$) may then be determined 196:

$$Bw_e = \frac{\phi_t - (\phi_{max}(1 - V_{cl}))}{V_{cl}} \tag{43}$$

Utilizing this $Bw_e$ curve, a bound water index curve ($Bw_i$) is determined 198:

$$Bw_i = 1 - \frac{Bw_e - Bw_{Mn}}{Bw_{Mx} - Bw_{Mn}} \tag{44}$$

where $Bw_{Mx}$ and $Bw_{Mn}$ represent maximum and minimum values, respectively, of the $Bw_e$ curve as determined through techniques familiar to the art. This bound water index may then be utilized to determine terms $N_{cl}$ and $\rho_{cl}$ 200 in a manner similiar to that utilized with the potassium index ($K_i$) of the previous embodiment:

$$N_{cl} = N_{cl1} + (N_{cl2} - N_{cl1})(Bw_i) \tag{45}$$

and $$\rho_{cl} = \rho_{cl1} + (\rho_{cl2} - \rho_{cl1})(Bw_i) \tag{46}$$

Terms $N_{cl}$ and $\rho_{cl}$ may then be utilized in a manner such as that discussed with respect to the previous embodiment, and illustrated in steps 84 through 146 of FIGS. 3A–C, to determine additional formation characteristics and plot a log curve representative thereof.

Many modifications and variations besides those specifically mentioned herein may be made in the techniques and structures described herein and depicted in the accompanying drawings without departing substantially from the concept of the present invention. For example, many relations are known to the art for determining formation porosity and may be utilized in accordance with the present invention. Similarly, a variety of relations are known for determining permeability and may be used to determine permeability data in response to water saturation and for porosity data and may be utilized in accordance with the present invention. Additionally, supplemental core data may be used to further evaluate or interpret parameters in accordance with techniques such as those described herein. Accordingly, it should be clearly understood that the forms of the invention described and illustrated herein are exemplary only, and are not intended as limitations on the scope of the present invention.

The embodiments of the invention in which an exclusive property or privilege is claimed are defined as follows:

1. A method of determining characteristics of shales in subsurface earth formations, comprising the steps of:
   determining the volume of clay contained in said subsurface earth formations;
   determining a first property related to the presence of exchangable cations of said shales in said formations; and
   determining a second property related to the potential clay swelling of said shales in said formations, said second property determined in response to said volume of clay and said first property.

2. The method of claim 1, wherein the step of determining the volume of clay comprises the steps of:
   deriving natural gamma ray spectral data from said formations; and
   determining said volume of clay in response to said natural gamma ray spectral data.

3. The method of claim 1 wherein the step of determining a first property of said shales in said formations comprises the step of determining the cation exchange capacity of said shales.

4. The method of claim 1 wherein the step of determining said second property of said shales in said formations comprises the step of determining the percent expandable clay layers of said shales.

5. The method of claim 4 wherein the present expandable clay layers of said shales is determined in accordance with the relationship:

$$PCEL = 1/K((CEC/Vcl) - C)$$

where
   PCEL is the percent expandable layers of the shales;
   CEC is the cation exchange capacity of the shales;
   Vcl is the volume of clay contained in the earth formations; and
   C and K are constants.

6. A method of determining characteristics of shales in subsurface earth formations, comprising the steps of:
   determining the volume of clay contained in said subsurface earth formations;
   determining the cation exchange capacity of said volume of clay;
   determining the percent expandable layers of said shales in said formations in response to said volume of clay and the cation exchange capacity of said shales.

7. The method of claim 6, wherein said step of determining the cation exchange capacity of said volume of clay comprises the steps of:
   relating data derived from a first well logging apparatus to data derived from a second well logging apparatus; and
   determining said cation exchange capacity in response to said related data of said first and second well logging apparatus and said determined volume of clay.

8. The method of claim 7 wherein said steps of relating data derived from a first well logging apparatus to data derived from a second well logging apparatus include the steps of:
   determining response indicies of said first well logging apparatus representative of a maximum volume of clay;
   determining response indicies of said first well logging apparatus representative of a minimum volume of clay;
   determining response indicies of said second well logging apparatus representative of maximum volume clay;
   determining response indicies of said second well logging apparatus representative of a minimum volume clay; and
   relating said maximum and minimum response indicies of said first well logging apparatus to said maximum and minimum response indicies of said second well logging apparatus.

9. The method of claim 7, wherein said volume of clay is determined in response to data derived from a third well logging apparatus.

10. A method for generally continuously determining formation characteristics throughout the vertical extent of clay-bearing formations, comprising the steps of:
    determining the volume of clay within said formations at a plurality of incremental depth horizons therein;
    determining the response of a first well logging apparatus within an environment composed essentially entirely of clay,
    said response determination made at a plurality of depth horizons directly related to said depth horizons at which said volume of clay determinations were made;
    said environment comprising clay types essentially equivalent to those found within said determined volume of clay at said depth horizons, said clay types in said environment in proportions generally equivalent to the relative proportions in which said clay types are found within said determined volumes of clay;
    determining the response of a second well logging apparatus within said clay environment;
    determining first characteristics of said formations generally continuously in response to at least one of said determined responses of said first and second well logging apparatus within said clay environment, said first characteristics include parameters of the bound water within said formations;
    determining second characteristics of said formations in response to said first characteristic, said second characteristics comprising the cation exchange capacity of said formations; and
    determining third characteristics of said formation in response to said second characteristics and said volume of clay, said third characteristics comprising an indicator of potential clay swelling.

11. The method of claim 10, wherein said steps of determining the responses of said first and second well logging apparatus within said clay environment comprises the steps of:
    measuring the responses of said first well logging apparatus within said formations;
    measuring the responses of said second well logging apparatus within said formations;
    determining the responses said first and second well logging apparatus would yield within said clay environment in response to said measured responses of said first and second well logging apparatus within said formations and said determined volumes of clay within said formations.

12. A method of determining characteristics of the shales in shale-sand subsurface earth formations, comprising the steps of:
    determining the volume of clay contained in said subsurface earth formations;
    determining response indicies of a first well logging apparatus representative of a maximum and a minimum volume of clay;
    determining response indicies of a second well logging apparatus representative of a maximum and a minimum volume of clay;
    relating said maximum and minimum response indicies of said first well logging apparatus and of said second well logging apparatus;
    determining the cation exchange capacity of said volume of clay in response to said related response indicies of said first and second well logging apparatus and said determined volume of clay; and
    determining the percent expandable layers of said shales in response to said volume of clay and the cation exchange capacity of said shales.

* * * * *